(12) United States Patent
Chu et al.

(10) Patent No.: US 10,958,454 B1
(45) Date of Patent: Mar. 23, 2021

(54) SYSTEM AND METHOD FOR CABLE LINK ESTABLISHMENT

(71) Applicant: Logitech Europe S.A., Lausanne (CH)

(72) Inventors: Joseph Yao-Hua Chu, Los Gatos, CA (US); Tsung-Ting Tsai, Fremont, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

(21) Appl. No.: 15/931,499

(22) Filed: May 13, 2020

(51) Int. Cl.
| | | |
|---|---|---|
| *H04L 12/10* | (2006.01) | |
| *H01R 13/66* | (2006.01) | |
| *H04L 5/00* | (2006.01) | |
| *H04B 1/40* | (2015.01) | |
| *H04B 3/02* | (2006.01) | |
| *H02J 3/00* | (2006.01) | |

(52) U.S. Cl.
CPC .......... *H04L 12/10* (2013.01); *H01R 13/665* (2013.01); *H04B 1/40* (2013.01); *H04B 3/02* (2013.01); *H04L 5/0048* (2013.01); *H02J 3/00* (2013.01)

(58) Field of Classification Search
CPC ..... H04L 12/10; H02J 3/00; H02J 3/02; H02J 7/007; G06F 1/3203; G06F 1/266; H04B 1/0475
See application file for complete search history.

(56) References Cited

U.S. PATENT DOCUMENTS

| | | | |
|---|---|---|---|
| 8,948,197 B2 | 2/2015 | Jiang et al. | |
| 9,641,250 B2 | 5/2017 | Jiang et al. | |
| 9,971,115 B2 | 5/2018 | Jiang et al. | |
| 9,977,481 B2 | 5/2018 | Achillopoulos | |
| 9,979,479 B2 | 5/2018 | Parekh et al. | |
| 2014/0208140 A1* | 7/2014 | Brooks | G06F 1/28 713/320 |
| 2016/0080007 A1* | 3/2016 | Yong | H04B 1/0483 375/297 |
| 2016/0320819 A1* | 11/2016 | Atkinson | G06F 1/26 |
| 2016/0349292 A1* | 12/2016 | Atkinson | G06F 1/266 |
| 2017/0155518 A1* | 6/2017 | Yang | H04L 12/10 |
| 2018/0331548 A1* | 11/2018 | Hsu | H02J 7/0042 |
| 2019/0109480 A1* | 4/2019 | Hsu | G05F 1/56 |
| 2019/0341786 A1* | 11/2019 | Lee | G06F 1/3275 |

OTHER PUBLICATIONS

"Network Cable Math" www.mathscinotes.com/2012. Dec. 6, 2012.
(Continued)

*Primary Examiner* — Aristocratis Fotakis
(74) *Attorney, Agent, or Firm* — Patterson & Sheridan, LLP (57) ABSTRACT

Described herein are methods and systems for connecting via a cable a USB host and USB device over distances equal to greater than 50 meters. The methods and systems include having the host and device each send a pilot signal over the cable and the host and device, each detecting that the received pilot signal is valid. After confirming the validity of the pilot signals, the host begins standard USB protocols with the device. The system and methods also allow for the insertion of a power over Ethernet device into the cable to provide power to a remote USB device. In some embodiments, only the D+ and D− lines are used allowing multiple independent USB connections over the cable.

20 Claims, 12 Drawing Sheets

(56) References Cited

OTHER PUBLICATIONS

"Universal Serial Bus Specification" Apr. 27, 2020. Revision 2.0. 622 pages.
Specifications—UTP CAT 6 Cable.
"Power Over the Ethernet", Wikipedia. Feb. 22, 2020.
"Communications" Wikipedia. Oct. 4, 2019.
Universal Serial Bus 3.0 Specification. Nov. 12, 2008. 482 pages.

* cited by examiner

SYSTEM AND METHOD FOR CABLE LINK ESTABLISHMENT

BACKGROUND

Field of the Invention

Embodiments disclosed herein generally relate to an apparatus and method for establishing a communications link over a cable that connects electronic devices.

Description of the Related Art

The popularity of interconnected consumer electronics and video conferencing equipment has increased dramatically in the past decade. As the number of electronic devices and the reliance on these electronic devices has increased, a need for these often separate and spatially distributed devices to interact and interface with each other has increased. One issue with the significant increase in the use of these distributed electronic devices has been the need for them to reliably initiate and continue a communication protocol between devices over extended distances. The communication protocols are usually standardized.

With the popularity of USB connected devices, users are continually amassing USB cables and positioning USB connected devices in various locations within their residence, conference room, or other similar locations. USB 1.0/1.1 enabled devices have been almost entirely supplanted by USB 2.0 and USB 3.0/USB 3.1 devices. However, a common problem with positioning USB devices in different places within a room or in other rooms of a building is that users often make the mistake of using a 3-meter cable that came with a device and then purchase a 3-meter extension to make a cable that is about 6 meters in total length. This kind of setup will not work due to the attenuation of the signals transferred between the connected devices and synchronization issues created due to the cable length. To resolve this issue, users typically will use a special type of USB cable known as an active or repeater cable. This special cable, which is actually a single port hub, is problematic since it is bus-powered and thus can only provide limited current on the bus power lines. In addition, the USB 2.0 specification places a limit on upstream ports that they can only draw current, not source current. This limit makes the use of an active repeater cable difficult.

The USB 2.0 specification describes a physical layer and a protocol layer. The specification states that the physical layer operates at 480 Megabits/second using a single differential pair of terminated lines with a voltage swing from −10 mV to +10 mV for a logic low and 360 mV to 440 mV for a logic high. The specification for the physical layer also effectively limits the length of the cable for full-speed devices to about 5 meters. Distances longer than about 5 meters between USB hosts and devices can be achieved by using several USB hubs, but even with hubs, the length is limited to about 30 meters.

It is desirable to connect a USB host and USB device over distances that exceed 50 meters. It is also desirable to allow for active power insertion for distances that exceed 50 meters because powering devices via a cable itself that exceeds 50 meters may not be feasible or at least severely limits the current available to the devices.

SUMMARY

Embodiments presented herein provide a connection between a USB host and USB device over distances longer than 50 meters, allow for power insertion in the cable connecting the host and device and provide a link establishment scheme to assure a reliable connection is present before the USB 2.0 handshake protocol is allowed to proceed.

Embodiments provide a method for establishing a communications link over a cable between a host and a device. The method includes generating and sending over a first pair of conductors of the cable assembly a host differential pilot signal to the device, where the host differential pilot signal is ac-coupled to the first pair of conductors. The method further includes receiving a device differential pilot signal over a second pair of conductors of the cable assembly from the device. The device differential pilot signal is ac-coupled to the second pair of conductors. In response to a host differential pilot signal being received at the device and found to be valid, the device sends the device differential pilot signal to the host and is ready to respond to a protocol initiated by the host, and in response to the device differential pilot signal being received at the host and found to be valid, the host is ready to initiate the protocol with the device. The host then initiates the protocol over a third pair of conductors.

Other embodiments are a system and computer-readable medium that perform one or more aspects of the above method.

BRIEF DESCRIPTION OF THE DRAWINGS

So that the manner in which the above-recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified, and details or components omitted for clarity of presentation and explanation. The drawings and discussion serve to explain principles discussed below, where like designations denote like elements.

DETAILED DESCRIPTION

Described herein is a technique for providing a self-testing, reliable communications link between a USB host and another USB device over distances that are many times longer than those allowed by the USB specification. Upon connecting the cable to the USB host and USB device, pilot signals are sent by the USB host to the USB device and vice-versa. If both of the received pilot signals are detected as valid, then the link is deemed reliable, and the USB link protocol is allowed to proceed.

Hardware and System Configurations

Figure 1A:
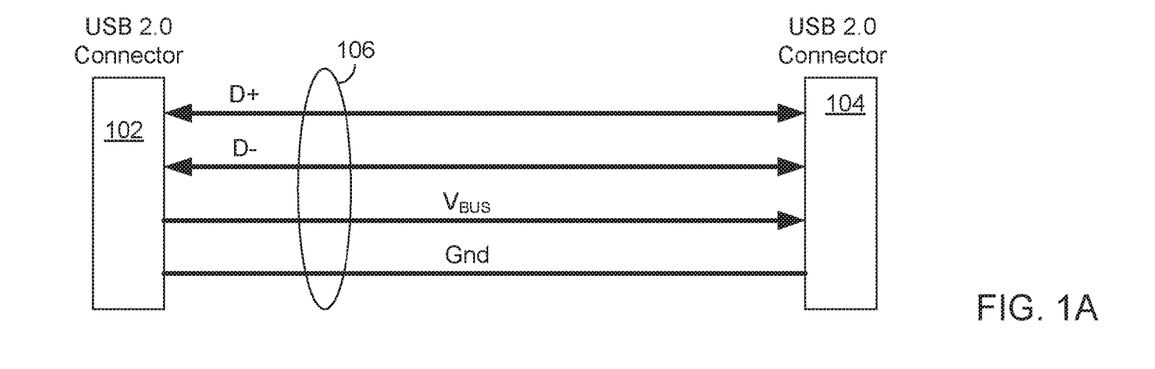
FIG. 1A depicts a USB 2.0 cable between a pair of connectors.

FIG. 1A depicts a USB 2.0 cable between a pair of connectors. Connectors 102, 104 are standard USB 2.0 connectors, each having four pins. According to the specification governing USB 2.0, the USB 2.0 cable 106 extending between the connectors includes two pairs of conductors. The first pair of conductors, labeled D+ and D−, is a signaling pair. The second pair of conductors, labeled VBUS and Gnd, is a power and ground pair. The specification for USB 2.0 sets out electrical requirements for these conductors to meet specific performance goals. For reliable high-speed operation, which is signaling at 480 Megabits per second (480 Mbps), the cable must be terminated with a resistance of 45 ohms from each wire to ground, resulting in a differential termination of 90 ohms, to which the impedance of the cable should be matched. Termination of the cable prevents reflections which increase noise on the cable and lower the signal to noise ratio, which if too low makes a signal unreliable to recover. The specification also requires that, for high-speed operation, the total attenuation of the conductors over the cable length cannot exceed about 6 decibels (dB) where a decibel is defined as 10 (log 10 Pin/Pout), where Pin is the input power and Pout is the output power. Attenuations higher than this amount will cause the signal voltage at the end of the conductor to be too small to be reliably detected. Because the wire sizes (min 28 gauge) and connectors are specified, the cable length is effectively limited by signal pair attenuation (max 5.8 dB for the cable), propagation delay (max 26 nanoseconds (ns)) and voltage drop (125 millivolts at 100 milliamps/unit load) on the Gnd conductor due to the Gnd conductor resistance (0.2 ohm/meter). A cable length of about 5 meters is typically the maximum length. Shorter cables must be used if high-power devices (up to 5 unit loads) are used. The USB 3.0 specification places similar or stricter limits on cable properties (due to its higher signaling speed of 5 Gbps), which in turn further limits the length of cable that will work reliably.

Figure 1B:
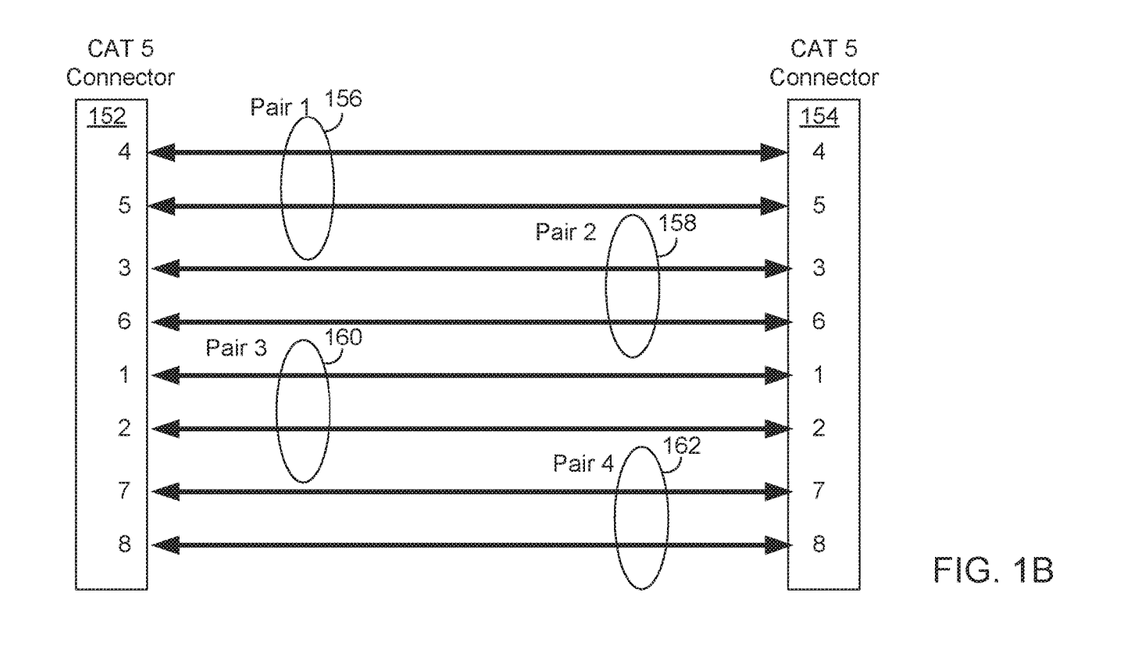
FIG. 1B depicts a category 6 cable between a pair of connectors.

FIG. 1B depicts a Category 6 (Cat6) cable between a pair of connectors. Connectors 152, 154 are standard RJ-45 connectors, each having eight pins. The Cat6 cable includes four pairs of conductors 156, 158, 160, 162, each 24 gauge. The cable has a characteristic impedance of about 100 ohms and an attenuation of about 0.3 dB/meter at 200 MHz. Thus, the attenuation for Cat6 cable over 5 meters is about 1.5 dB, compared to about 6 dB for a typical USB 2.0 cable. Other cables, such as Category 5e, have attenuations that are higher but still significantly less than a USB 2.0 cable over 5 meters. The superior attenuation characteristics of the cable 210a, 210b allow for distances longer than 50 meters over which USB host 202 and USB device 204 can communicate.

Figure 2A:
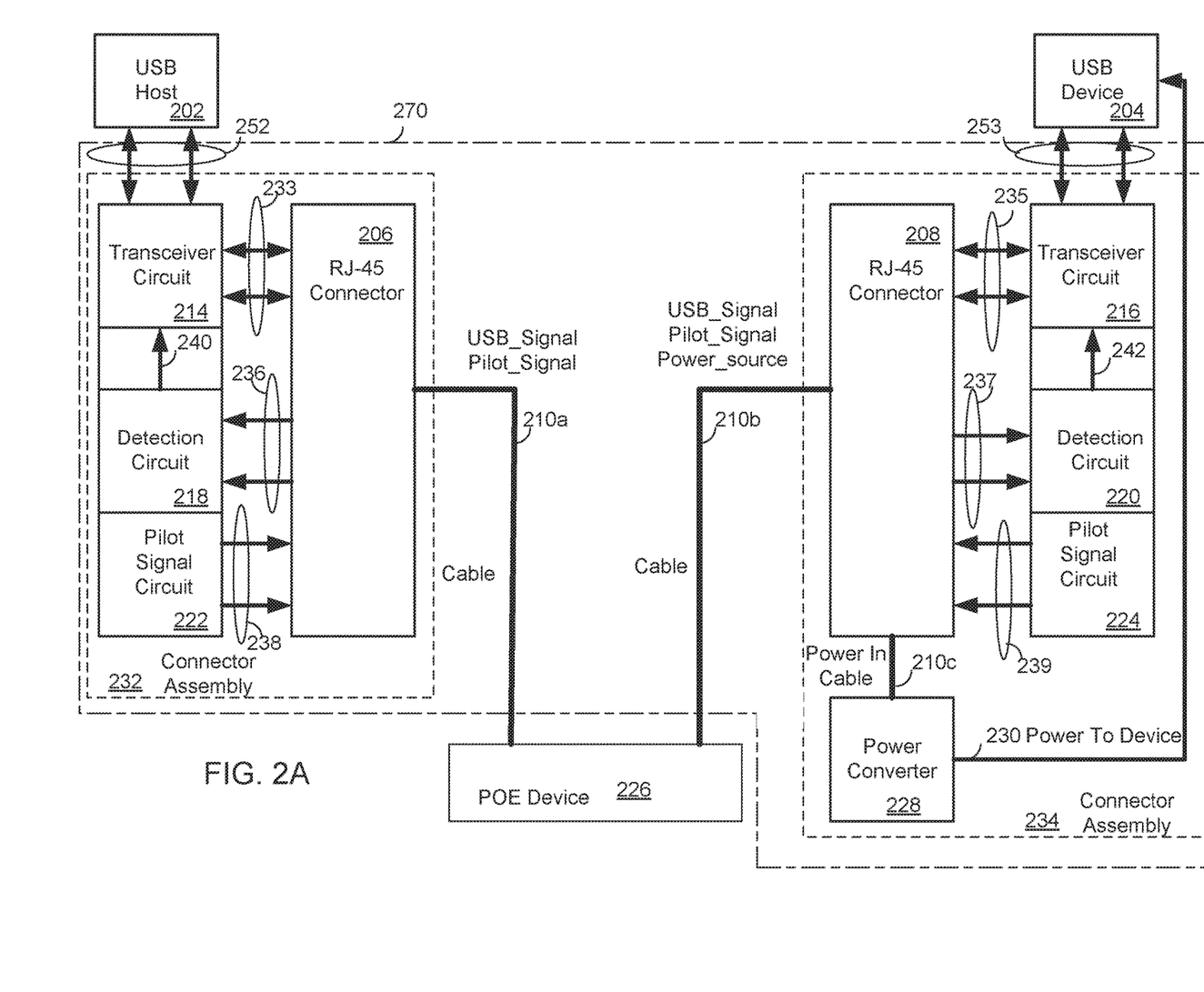
FIG. 2A depicts a USB 2.0 cable connection between a pair of connectors, in an embodiment.
Figure 2B:
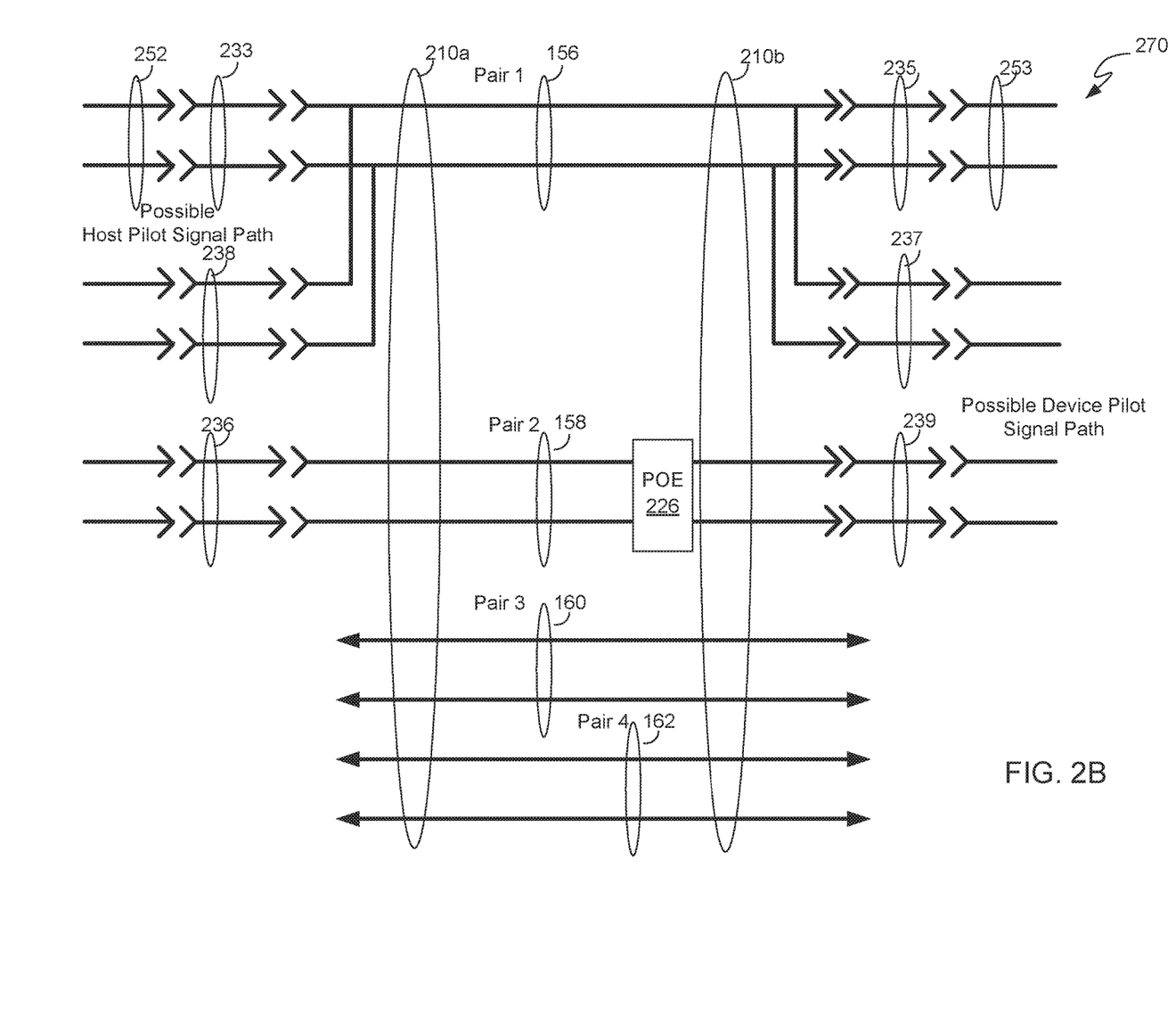
FIG. 2B depicts in more detail the various conductor paths, in an embodiment.

FIG. 2A depicts a cable assembly 270, portions of which are shown in more detail in FIG. 2B. The cable assembly 270 includes a USB 2.0 cable connection formed between a pair of USB 2.0 enabled devices, such as a USB host 202 and USB device 204, in an embodiment. The cable assembly 270 includes a cable 252, a connector assembly 232, cable 210a, cable 210b, a connector assembly 234, and a cable 253 that allows the USB host 202 and USB device 204 to communicate with each other over an extended distance, as will be discussed further below. In some embodiments, a POE device 226 is also inserted between cable 210a and cable 210b, as shown in FIG. 2. In some embodiments, the connector assembly 232 includes a connector 206, a transceiver circuit 214, a detection circuit 218, and a pilot signal circuit 222. In some embodiments, the connector assembly 234 includes a transceiver circuit 216, a detection circuit 220, and a pilot signal circuit 224. As will be discussed further below, the outputs of the detection circuits 218 and 220 may be coupled to the transceiver circuits 214, 216 via the connection 240 and 242, respectively. Cables 252 and 253 can be USB 2.0 cables having a configuration such as the cable illustrated in FIG. 1A.

Also shown in FIG. 2A are the POE device 226 and the power converter 228, which are described below. The transceiver circuit 214, 216 is further described with reference to FIG. 3. The pilot signal circuit 222, 224 is further described with reference to FIG. 4. The detection circuit 218, 220 is further described with reference to FIG. 5.

The circuits 214, 218, 222 can be housed as part of a connector assembly 232 that includes connector 206. The circuits 216, 220, 224 can be housed as part of a connector assembly 234 that includes connector 208.

The cable 210a, 210b is a Cat5, Cat6, or similar cable and may have inserted therein an optional Power-over-Ethernet (POE) device 226 to provide power to the USB device 204. Such devices conform to IEEE 802.3af and 802.3at standards and transmit power from power sourcing equipment (PSE) to a powered device (PD), such as USB device 204. Use of such devices permits power to be delivered to remote devices without the need to install electrical power outlets at the remote device or to supply power to the device from the cable. The POE device 226 is further described with reference to FIG. 6A.

The Power Converter 228 provides for a decrease in the voltage received from a POE device 226 inserted into the cable in order to meet the USB device voltage and current requirements. The Power Converter 228 is further described with reference to FIG. 6B.

FIG. 2B depicts in more detail the various conductor paths of the cable assembly, according to an embodiment. As shown, pair 1 156 of the cable 210a couples to cable 252, pair 233 and 238 on the host side and pairs 235, 237, and cable 253 on the device side, where pair 1 is the data pair. Pair 2 158 couples to pair 236 and 239 and may have POE device 226 inserted. Pair 3 160 and pair 4 162 are not used but can be used in a similar arrangement, which is further described in reference to FIG. 10.

Modules and Circuit Configurations

Figure 3:
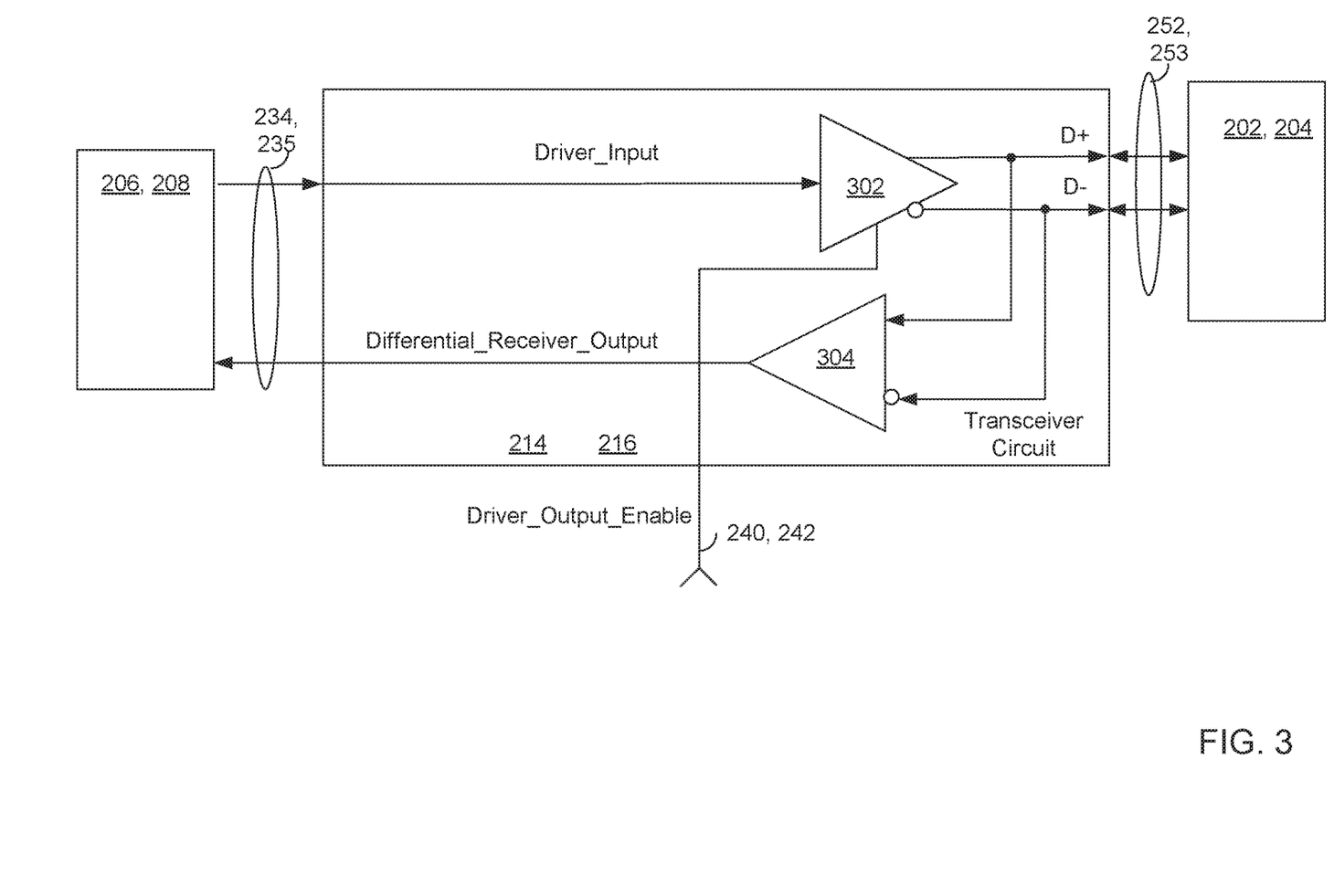
FIG. 3 depicts a transceiver circuit, in an embodiment.

FIG. 3 depicts a transceiver circuit, in an embodiment. Each transceiver circuit 214, 216 includes a driver 302 and a receiver 304. The driver 302 takes a single Driver input signal, boosts the signal to the voltages specified in the USB specification, and converts the signal to a differential signal for the D+ and D− lines. The driver 302 has a Driver_output_enable line 240 for carrying a signal that when asserted enables the driver 302 of transceiver circuit 214 to connect to the D+ and D− lines on the host side and Driver_output_enable line 242 for carrying a signal that when asserted enables the driver of transceiver circuit 216 to connect to the D+ and D− lines on the device side. If the driver 302 of the transceiver circuit 214, 216 is not enabled, the driver is disconnected from the line. The receiver 304 receives the differential signal on respective D+ and D− lines and converts the signal to single-ended Differential_receiver_output signal.

Figure 4:
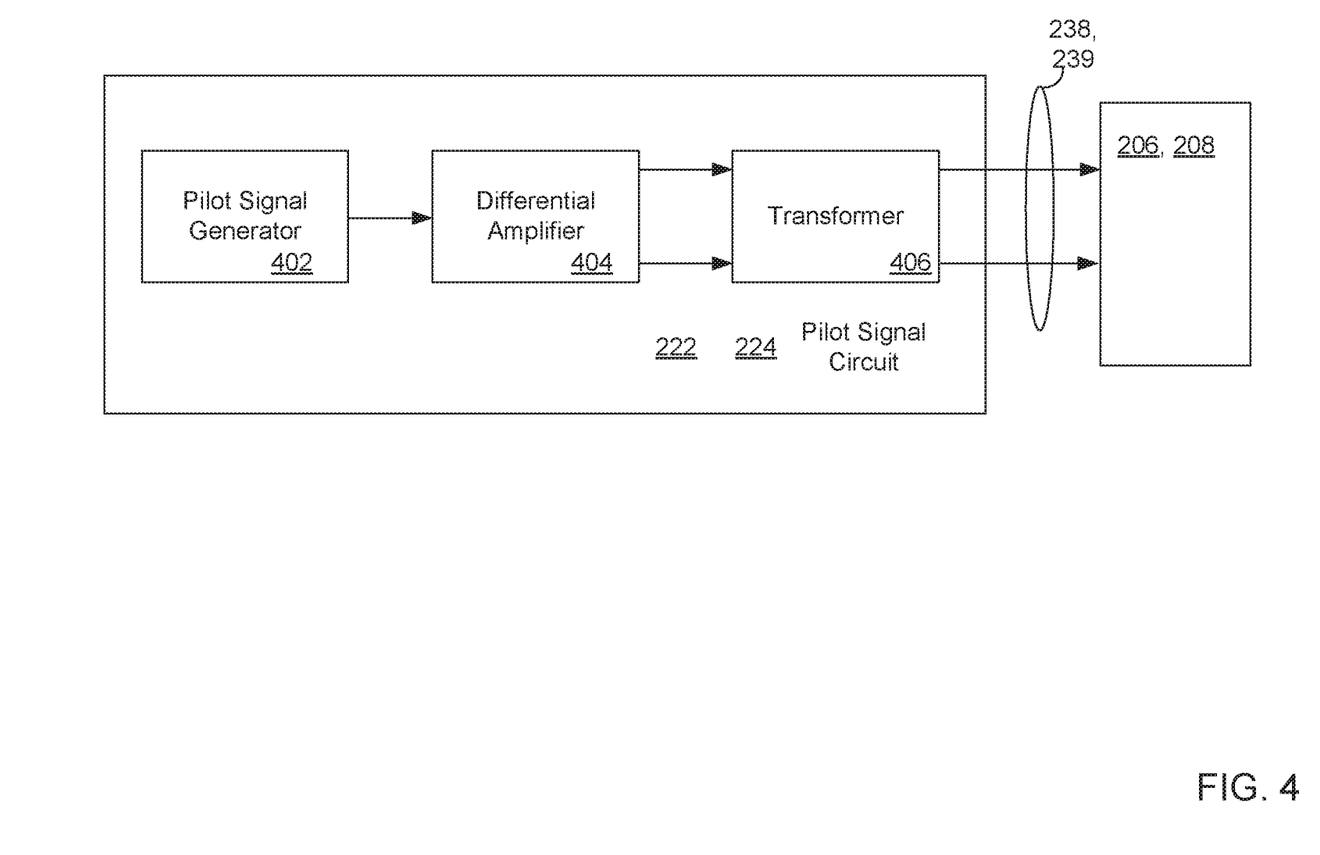
FIG. 4 depicts a pilot signal circuit, in an embodiment.

FIG. 4 depicts a pilot signal circuit, in an embodiment. The pilot signal circuit 222, 224 is the same for both the host side and the device side and includes a pilot signal generator 402, a differential amplifier 404, and a differential transformer 406.

The pilot signal generator 402 preferably generates a sine wave, though other AC waveforms, such as a triangle wave, can be used. In one embodiment, the frequency of the wave is 48 kHz. In some embodiments, the pilot signal generator 402 can be replaced with an intelligent device such as a field-programmable gate array (FPGA), Silicon on Chip (SoC) device, or a microprocessor control unit (MCU), where the MCU includes at least one processor and a memory containing program instructions for carrying out the functions of the pilot signal generator as well as other functions, such as the device detector, described herein. An intelligent device allows for an intelligent pilot signal, such as a single cycle of a sine wave. The differential amplifier 404 boosts the signal from the pilot signal generator 402 and converts the signal to a differential signal, which is then applied to a differential transformer 406, which removes any DC component from the output waveform of the differential transformer 406. Removing a DC component from the waveform assures that receivers of the waveform operate in their linear range instead of being forced out of their linear range by a DC component. In addition, the differential transformer 406 can protect the system from an outside AC unexpected voltage surge.

Figure 5:
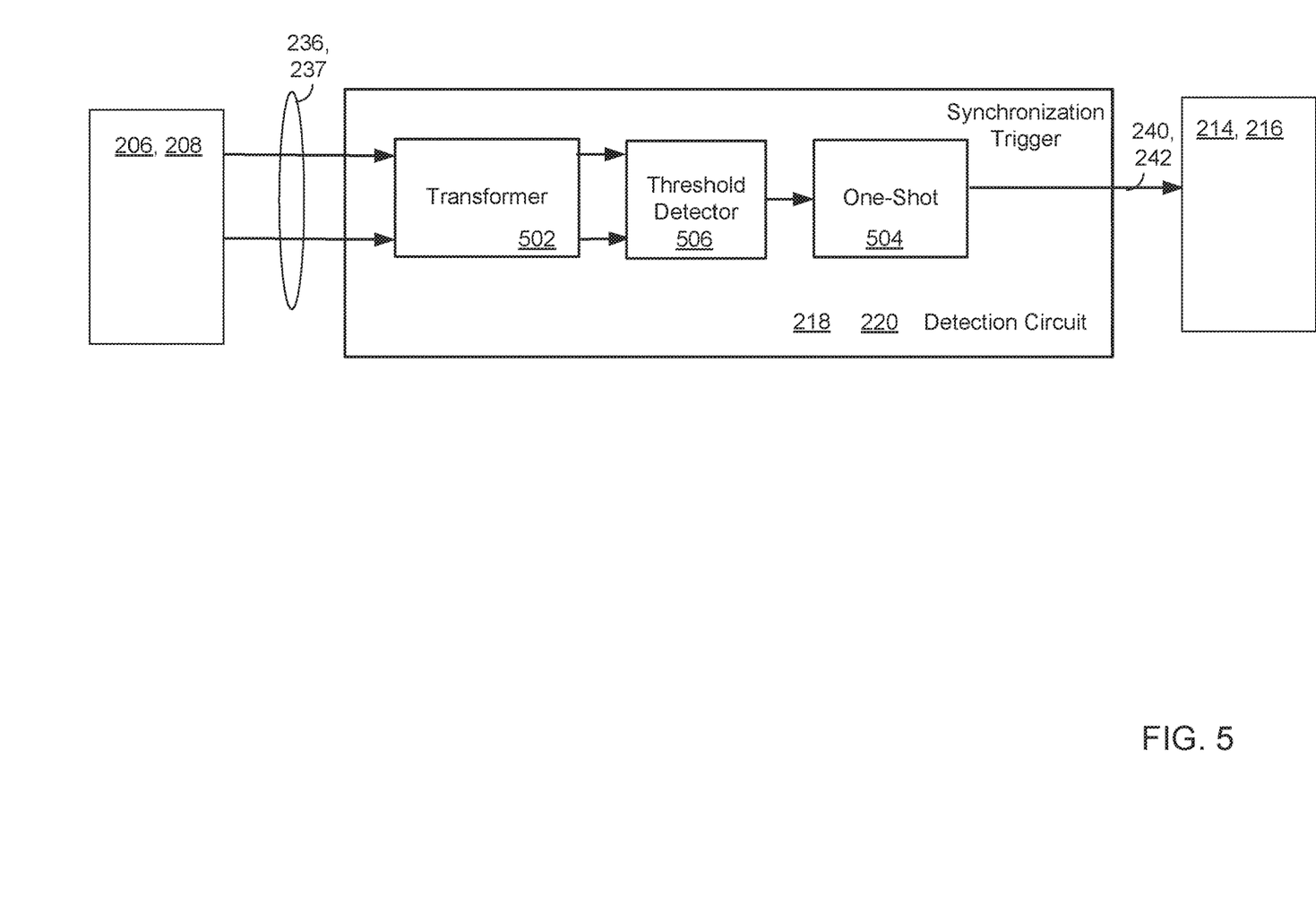
FIG. 5 depicts a detection circuit, in an embodiment.

FIG. 5 depicts a detection circuit, in an embodiment. The detection circuit 218, 220 is the same for both sides and includes a differential transformer 502 and a one-shot circuit 504. The differential transformer 502 receives a differential signal generated from the opposite side's pilot signal generator circuit but blocks any DC signal that may be on the conductor pair. The transformer not only blocks any DC signal on the conductor pair, thus isolating circuits 218, 220 from other circuits, but also eliminates any common-mode signal on the pair. In one embodiment, the transformer is a 10/100 BASE-T transformer, which can protect the system from an external AC unexpected voltage surge. If and when the differential signal is present, the transformer provides the transformed differential signal to the threshold detector 506, which compares the differential signal against a predetermined threshold. The output of the threshold detector 506 is applied to the one-shot circuit 504. The one-shot circuit 504 responds to the detection of the differential signal and provides a synchronization trigger output 240, 242, which is applied to enable the transceiver circuit 214 on the same side as the detection circuit. When the synchronization trigger is asserted, the transceiver circuit 214, 216 is enabled. In some embodiments, the one-shot circuit 504 can be replaced with an intelligent device such as an FPGA, SoC device, or an MCU, where the MCU includes at least one processor and a memory containing program instructions for carrying out the functions of the pilot signal generator as well as other functions, such as the device detector, described herein.

Figure 6A:
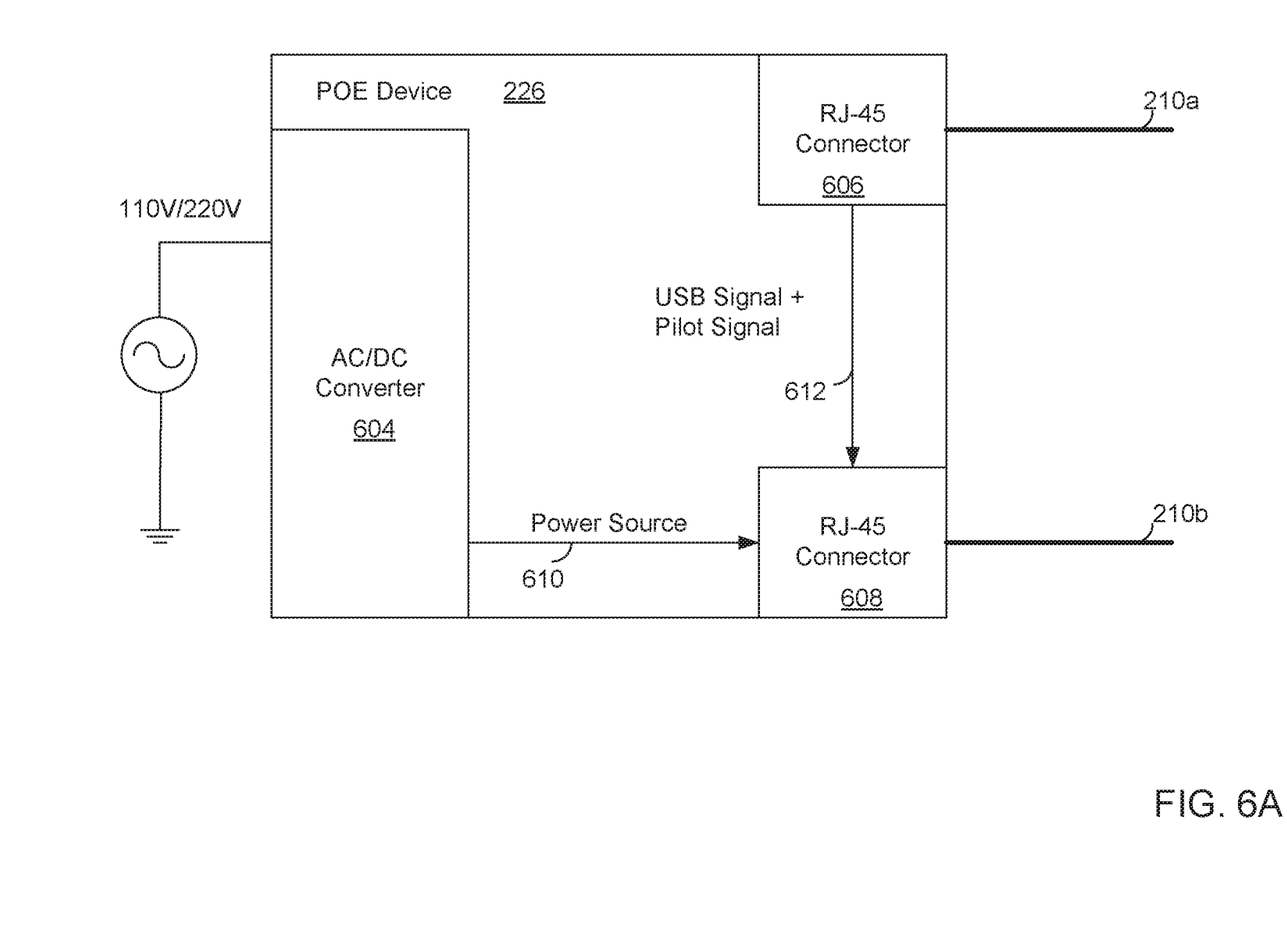
FIG. 6A depicts a POE device, in an embodiment.

FIG. 6A depicts a POE device, in an embodiment. As shown, the POE device 226 includes an AC-to-DC converter 604, a power source connection 610, an RJ-45 connector 606 for connecting to cable 210a and an RJ-45 connector 608 that is coupled to connector 606 to receive the signals on cable 210a to connect those signals and the power source connection 610 to cable 210b. The AC-to-DC converter takes alternating 120 V AC power source and converts it to a DC power source, which is available on power source connection 610. Thus, connector 606 receives USB signals and the pilot signal from cable 210a and sends those signals via connection 612 to the connector 608. Though connection 612 may intercept the DC power conductors, it maintains AC coupling between cable 210a and cable 210b so that AC signals can pass. Connector 608 picks up the power source on power source connection 610 and sends the USB signal, the pilot signal and the power source on cable 210b.

Figure 6B:
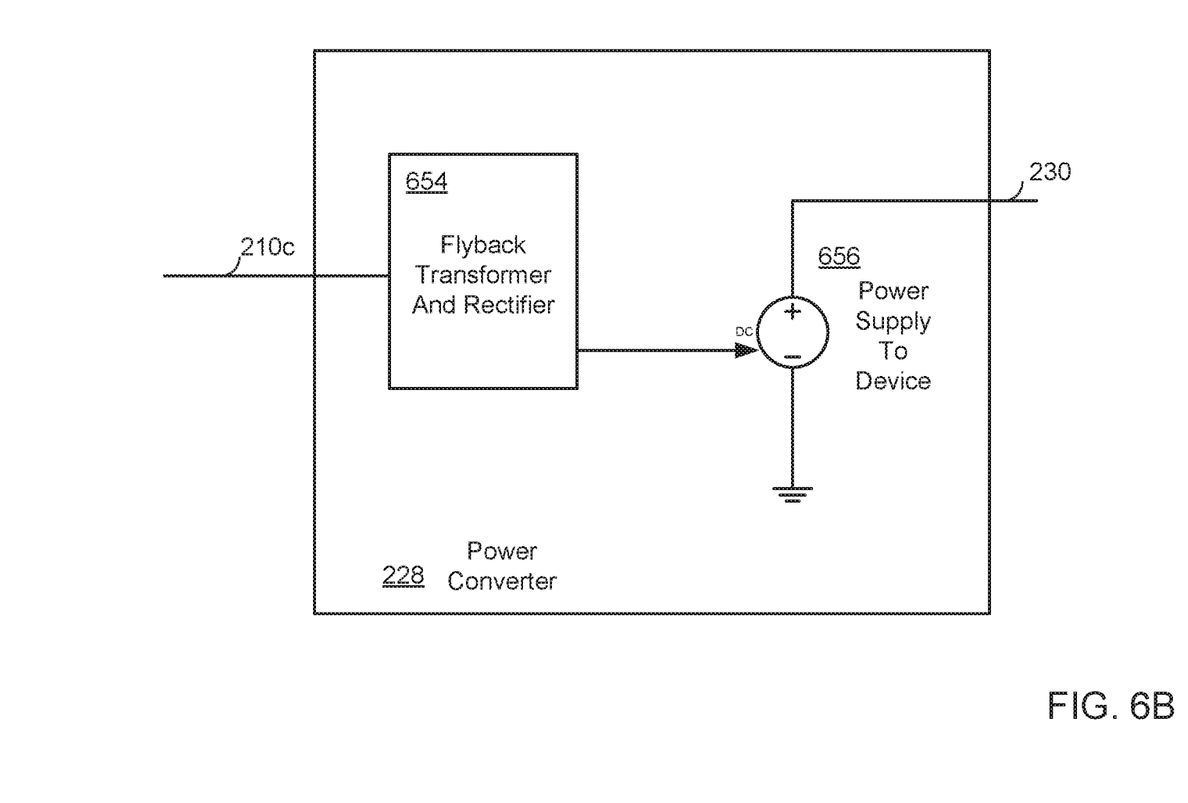
FIG. 6B depicts a power converter, in an embodiment.

FIG. 6B depicts a power converter device, in an embodiment. As shown, the power converter includes a flyback transformer and rectifier 654 arrangement and a source of DC power 656 derived from the output of the flyback transformer and rectifier 654. The flyback transformer receives a power input from cable 210c, which is connected to connector 208. The source of the DC power source 656 is connected to cable 230, which supplies power to USB device 204.

Communication Processes

Figure 7:
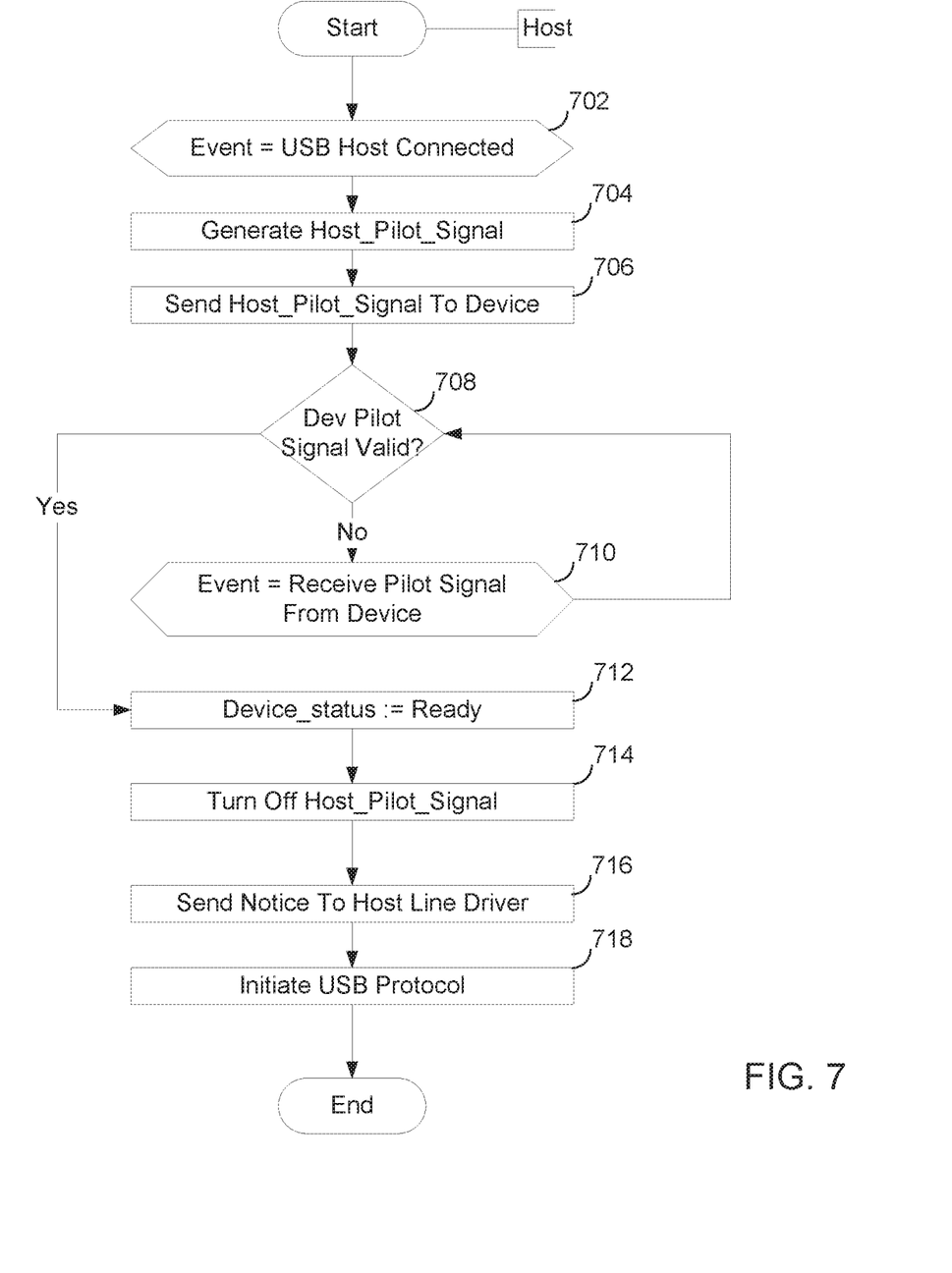
FIG. 7 depicts a flow of operations by a host, in an embodiment.

FIG. 7 depicts a flow of operations by a host to establish a link between a USB host and USB device over distances that are many times longer than those allowed by conforming to the USB specification, in an embodiment.

In step 702, a connection event occurs in which the connector assembly 232 determines that it is connected to a USB host 202. The connection event can be detected by a detection circuit within the connector assembly 232 that senses that a voltage between the VBUS and Gnd pair, supplied by the USB host 202 within the cable 252, reaches a level of about 4.0 volts. Alternatively, the connector assembly 232 can detect the inactive signal levels of the D+, D− pair.

In step 704, a host differential pilot signal is generated (turned on) from the host-side pilot signal circuit 222. In step 706, the host differential pilot signal is sent from connector assembly 232 to the connector assembly 234, which is connected to USB device 204. In some embodiments, the host differential pilot signal comprises an AC signal that has a desired voltage amplitude, such as a voltage amplitude of 1 volt or more, 2 volts or more, 3 volts or more, or even 4 volts or more. The path of the host differential pilot signal is depicted in FIG. 2B as traversing 238, 156 in cable 210a, pair 156 in cable 210b and 237, though any pair of wires in cables 210a, 210b can be used by the USB host 202 to send the host pilot signal. The pair can be one that is later used for transmission of data, as shown in FIG. 2B using a desired signal communication protocol (e.g., USB 2.0 protocol) because the detection circuits 218, 220, and the pilot signal circuits 222, 224 are isolated by their respective transformers 502, 406 from the transceiver circuits 214, 216. Or the pair for the host differential pilot signal can be one, such as pair 3 160 in FIG. 2B, which is separate from the data signaling and power pair.

In step 708, the connector assembly 232 determines whether a valid device differential pilot signal is received from the device. If not, then in step 710, the connector assembly 232 waits for the device differential pilot signal and determines again, in step 708, whether the device differential pilot signal is valid. The process of detecting whether a valid differential device pilot signal has been generated and received includes the threshold detector 506 in the detection circuit 218 determining whether the received device differential pilot signal exceeds a threshold level, such as a level greater than 1 volt or more, 2 volts or more, 3 volts or more, or even 4 volts or more. The magnitude of the detected signal depends on the initial magnitude of the pilot signal and the attenuation of the pilot signal over the path of the device differential pilot signal. The path of the device pilot signal from connector assembly 234 to the connector assembly 232 is depicted in FIG. 2B as 239, pair 2 in cables 210a, 210b, and 236, though any pair of wires in cables 210a, 210b can be used to send the device pilot signal. For example, the pair for the device pilot signal can be a pair used for the data signaling or power or a separate pair, such as pair 4 162, in FIG. 2B. In addition, the timing of the device differential pilot signal can be used to determine a valid signal by counting the number of cycles that occur within a given time period. Detecting both the magnitude and the timing of the device pilot signal improves noise immunity.

If, as determined in step 708, the device differential pilot signal is valid, then in step 712, the host sets the device status to 'Ready' and, in step 714, turns off the host differential pilot signal. In step 716, the host sends notice to the driver in the host transceiver circuit 214, which enables the driver in that circuit. The order of steps 712 and 714 can be reversed or can occur at the same time. In step 718, having determined that the USB device 204 is ready, the USB host 202 initiates the USB protocol with the USB device 204.

Figure 8:
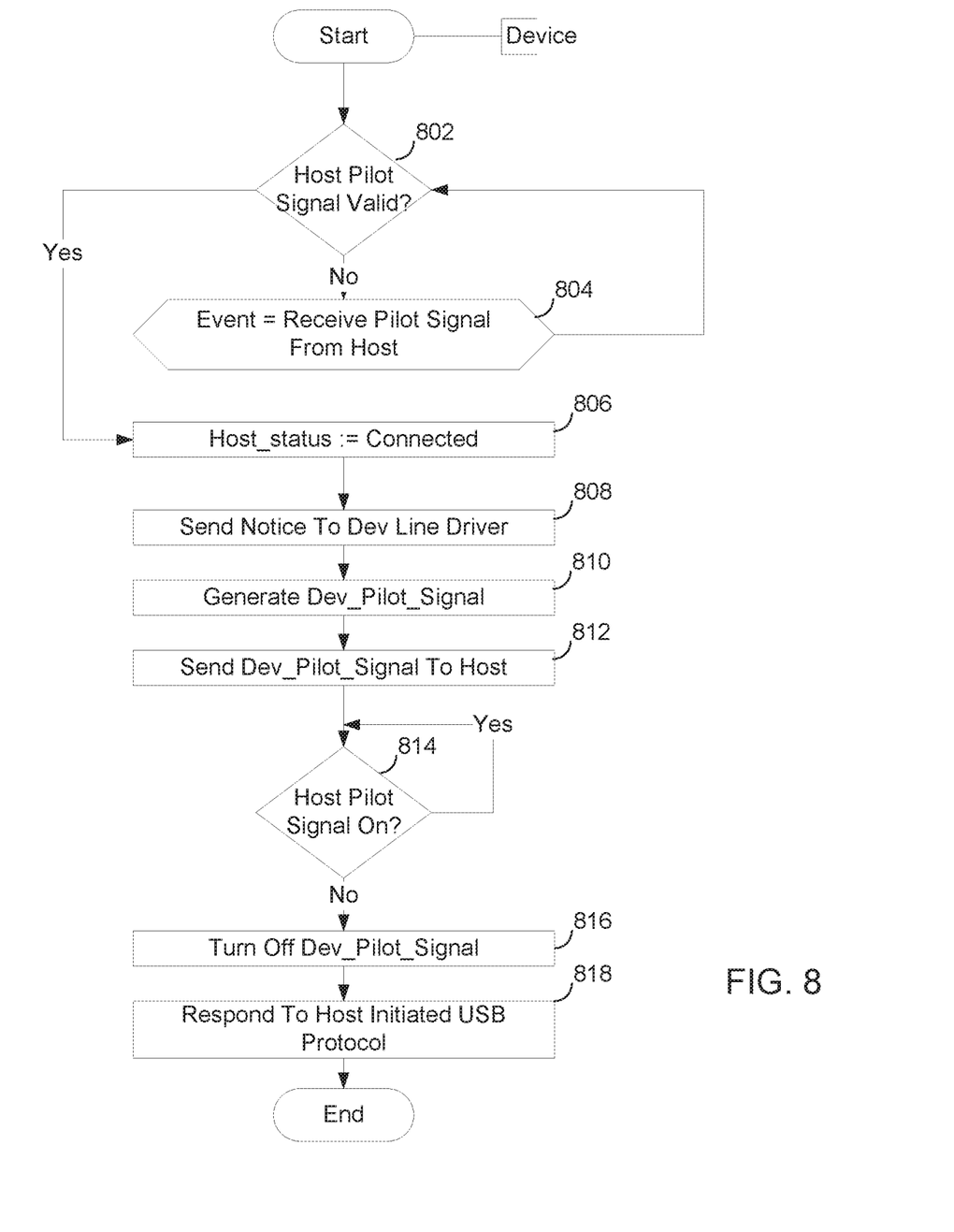
FIG. 8 depicts a flow of operations by a device, in an embodiment.

FIG. 8 depicts a flow of operations by a device, in an embodiment. In step 802, the connector assembly 234 determines whether a valid host differential pilot signal is present. In some embodiments, the host differential pilot signal is an AC signal with a desired voltage amplitude such as 1 volt or more, 2 volts or more, 3 volts or more, or even 4 volts or more. The process of detecting whether a valid host differential pilot signal has been generated and received by the device detection circuit 220 includes the threshold detector 506 in the detection circuit 220 determining whether a received host differential pilot signal exceeds a threshold level, such as 1 volt or more, 2 volts or more, 3 volts or more, or even 4 volts or more. As noted above, the magnitude of the detected signal depends on the initial magnitude of the host differential pilot signal and the attenuation over the path of the signal. Also, as noted above, the signal path of the host differential pilot signal from the connector assembly 232 to connector assembly 234 is depicted in FIG. 2B as 238, pair 1 156 in cable 210a, pair 1 156 in cable 210b, and 237.

If a valid device pilot signal is not present, as determined in step 802, then the connector assembly 234 waits for a host differential pilot signal in step 804 and again, in step 802, determines whether a valid differential host pilot signal is present. If so, then, in step 806, the connector assembly 234 sets the host status as 'Connected,' and in step 808 sends notice to the driver in the device transceiver circuit 216, which enables the driver in the device transceiver circuit 216. In step 810, the connector assembly 234 generates (i.e., turns on) a device differential pilot signal, and in step 812 sends the device differential pilot signal to the connector assembly 232. In step 814, the connector assembly 234 waits for the host differential pilot signal to turn off, which indicates that the device differential pilot signal was received by the connector assembly 232. In step 816, in response to the host differential pilot signal turning off, the connector assembly 234 turns off the device differential pilot signal. In step 818, the device responds to the host-initiated USB protocol. As mentioned above, the path of the device differential pilot signal from connector assembly 234 to connector assembly 232 is depicted in FIG. 2B as 239, pair 2 158 of cables 210a, 210b, and 236.

In some embodiments, the host differential pilot signal and the device differential pilot signal can be left on when each signal is on a dedicated pair of conductors. In these embodiments, steps 714, 814, and 816 are optional. For example, pair 3 160 and pair 4 162 can be dedicated to the host differential pilot signal and the device differential pilot signal, respectively, and left on. Leaving the pilot signals on allows the system to re-establish the link according to FIGS. 7 and 8 if the USB protocol encounters a failure and needs to be re-started.

Figure 9:
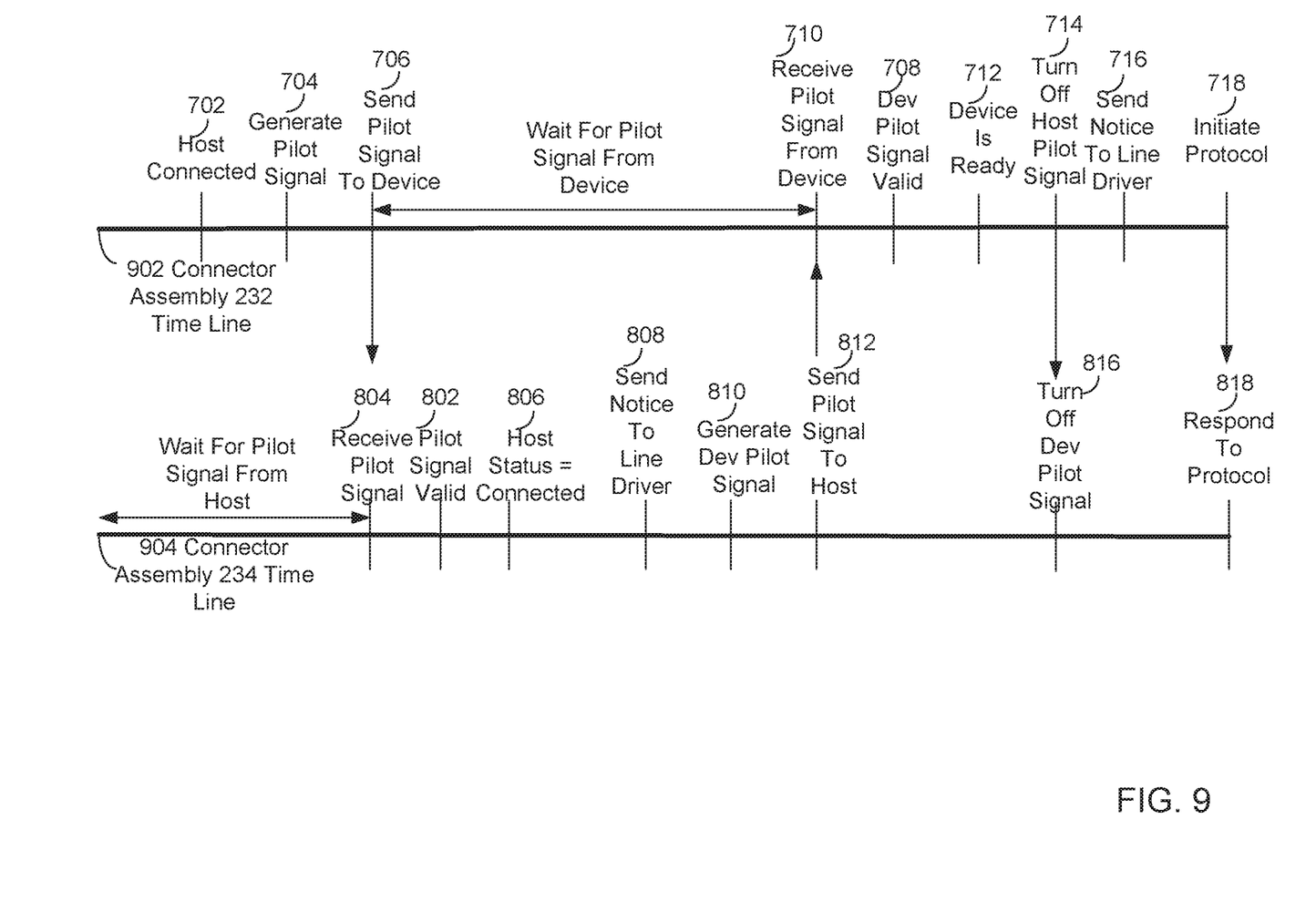
FIG. 9 depicts a host-side timeline and a device-side timeline, in an embodiment.

FIG. 9 depicts the operations of establishing a link between the host and device, in an embodiment. Timeline 902 is the timeline of the connector assembly 232, and timeline 904 is that of the connector assembly 234. At time 702, connector assembly 232 determines that the USB host 202 is connected. At time 704, the connector assembly 232 generates (i.e., turns on) the host differential pilot signal, and at time 706 sends the host differential pilot signal to the connector assembly 234. Thus, the sending the host differential pilot signal is conditioned on the connector assembly 232 being connected to the host.

At time 804, the device, which was waiting for the pilot differential signal from the host, receives the host differential pilot signal. Though step 804 is shown as simultaneous with step 706, a delay may be present, but for clarity is not illustrated. At time 802 determines that the differential pilot signal is valid. At time 806, the connector assembly 234 sets the host status to 'Connected' to reflect the fact that the connector assembly 232 is connected to the host. At time 808, the device sends notice to its driver to enable the driver, and at time 810 generates (i.e., turns on) the device differential pilot signal which it sends at time 812 to the connector assembly 232.

Thus, between times 706 and 710, the host has been waiting for the differential pilot signal from the device. Receiving the device differential pilot signal at time 710 indicates to the connector assembly 232 that the connector assembly 234 has received and validated the host differential pilot signal. At time 708, connector assembly determines that a valid device pilot signal is present, and at time 712 sets the device status to 'Ready.' At this point in time, the connector assembly 234 knows that it is connected to the host and that one of the conductor pairs is reliable. And connector assembly 232 knows that the device is ready and that a second one of the conductor pairs is reliable.

At time 714, the host turns off the host differential pilot signal. At time 816, the connector assembly 234, in response to the event at 714, turns off the device differential pilot signal. As mentioned above, in some embodiments, the actions at times 714 and 816 are optional. At time 716, the connector assembly 232 sends notice to its line driver to enable the line driver, and at time 718 initiates the USB protocol. At time 818, the device responds to the USB protocol initiated by the host.

Thus, sending and detecting a valid pilot signal by each side assures that, over a long distance (e.g., greater than 50 meters), a good connection is available so that a standard USB protocol over the distance is assured to operate correctly. In addition, the arrangement permits the use of a POE device to provide power to the device so that a remote device does not need a local power source.

While the description has focused on a particular embodiment, other embodiments are possible.

For example, once the link is established using a pilot signal frequency (say 2 MHz) that works for the distance involved, the link can be further optimized for bandwidth using the knowledge that both ends are reliably connected. For example, the frequency of the pilot signals can be tailored to the bandwidth of the link, the amplitude can be selected based on the available power, and the generating and detecting the pilot signals can occur according to an established protocol, such as an acknowledgment protocol (i.e., ACK, NACK).

In yet another example, category cables other than Cat6 can be used depending on the distance. Most category cables have voltage attenuation characteristics no greater than about 0.20 dB/meter and would be acceptable for distances of about 100 meters because a 4.0-volt signal would become about 400 millivolts at the end of 100 meters, which is sufficient for a receiver to detect the signal. Even a non-category cable with differential pairs is suitable for lengths exceeding 50 meters as long as the cable has an attenuation characteristic of about 0.2 dB/meter or less. Higher voltage drivers and more sensitive receivers can significantly improve the length of cable that will operate correctly.

In yet another example, the POE device can be replaced with an Ethernet hub that has a built-in POE function.

In yet another example, the pilot signal can be carried on the power pairs or unused pairs of the cable to allow for the use of different types of POE devices.

In yet another example, an analog switch can be added on the USB path to prevent unexpected surges that might damage the system. The switch is added to the input port of the device.

In yet another example, a gigabit-speed transformer in the pilot signal circuit and the detection circuit can be used for lower transmission loss and thus can help to extend the distance that is possible between host and device.

Figure 10:
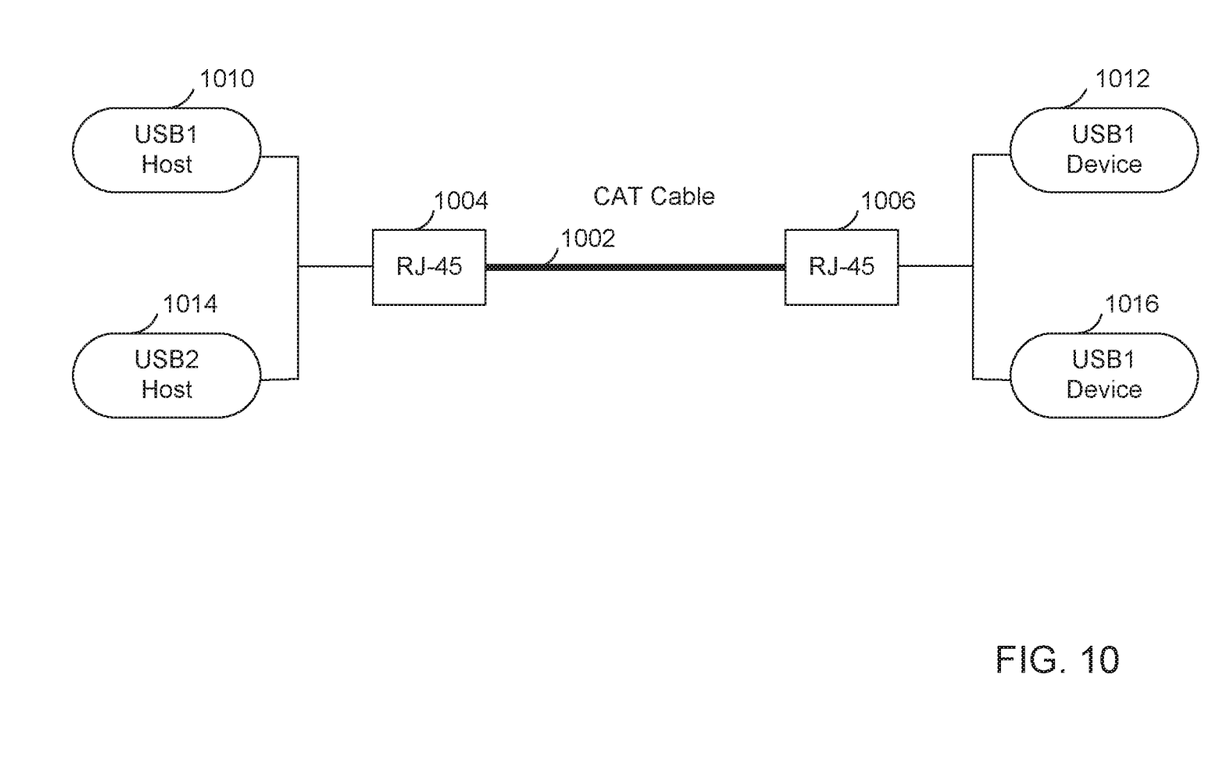
FIG. 10 depicts a single CAT cable carrying two USB connections, in an embodiment.

In yet another example as depicted in FIG. 10, by confining the pilot signals to the D+ and D− wires, each pair of wires in the cable can be used as an independent USB connection, and thus two independent USB connections are available from a 4-pair cable. For example, FIG. 10 depicts a single CAT cable carrying two USB connections, in an embodiment. A single CAT cable 1002 carries two USB connections, one connection from USB 1 host 1010 to USB 1 device 1012, and another connection from USB 2 host 1014 to USB device 1016, using the same connectors 1004 and 1006.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer-readable medium can also be distributed over a network-coupled computer system so that the computer-readable code is stored and executed in a distributed fashion.

What is claimed is:

1. A method for establishing a communications link between a host and a device using a cable assembly, the method comprising:
   generating and sending over a first pair of conductors of the cable assembly a host differential pilot signal to the device, wherein the host differential pilot signal is AC-coupled to the first pair of conductors;
   receiving a device differential pilot signal over a second pair of conductors of the cable assembly from the device, wherein the device differential pilot signal is AC-coupled to the second pair of conductors,
   wherein in response to a host differential pilot signal being received at the device and found to be valid, the device sends the device differential pilot signal to the host and is ready to respond to a protocol initiated by the host, and
   wherein in response to the device differential pilot signal being received at the host and found to be valid, the host is ready to initiate the protocol with the device; and
   initiating the protocol over a third pair of conductors.

2. The method of claim 1, wherein the third pair is any pair of conductors of the cable assembly including the first pair or the second pair.

3. The method of claim 1, wherein the host differential pilot signal received at the device is found to be valid by comparing the host differential pilot signal to a differential threshold.

4. The method of claim 1, wherein the device differential pilot signal received at the host is found to be valid by comparing the device differential pilot signal to a differential threshold.

5. The method of claim 1, wherein the cable between the host and the device includes a power over Ethernet (POE) device, wherein the power over Ethernet (POE) device is configured to provide power to the device via the cable.

6. The method of claim 5,
wherein the POE device intercepts one of the pairs of conductors of the cable assembly; and
wherein the POE device maintains an AC-coupled path for the intercepted pair.

7. The method of claim 1, wherein the host differential pilot signal and the device differential pilot signal are sine waves.

8. The method of claim 1, wherein the cable has a length that is equal to or greater than 50 meters.

9. A system for establishing a communications link between a host and a device using a cable assembly, the system comprising:
- a cable having a plurality of pairs of conductors, including a first pair and a second pair;
- a host transceiver circuit that is configured to generate a host enable signal and to transmit data to and receive data from the device via the first pair of conductors when the host enable signal is asserted;
- a device transceiver circuit that is configured to generate a driver enable signal, the device transceiver circuit configured to transmit data to and receive data from the host over the second pair of conductors when the driver enable signal is asserted;
- a host differential pilot signal generator circuit that is AC-coupled to the first pair of conductors and configured to generate a host differential pilot signal;
- a device pilot signal generator circuit that is AC-coupled to the second pair of conductors and configured to generate a device differential pilot signal;
- a host detector for detecting a device differential pilot signal and providing a synchronization trigger connected to the host enable signal;
- a device detector for detecting a host differential pilot signal and providing a synchronization trigger connected to the device enable signal;
- wherein when the device detector receives a host differential pilot signal and finds that the host differential pilot signal is valid, the device detector asserts the synchronization trigger to the device transceiver circuit; and
- wherein when the host detector receives a device differential pilot signal and finds that the device differential pilot signal is valid, the host detector asserts the synchronization trigger to the host transceiver circuit.

10. The system of claim 9,
wherein the device detector includes a threshold detector; and
wherein the device detector finds the host differential pilot signal valid when the threshold detector determines that the differential host pilot signal exceeds a threshold.

11. The system of claim 9,
wherein the host detector includes a threshold detector; and
wherein the host detector finds the device differential pilot signal valid when the threshold detector determines that the differential device pilot signal exceeds a threshold.

12. The system of claim 9, further comprising a power over Ethernet (POE) device, wherein the power over Ethernet (POE) device is configured to provide power to the device via the cable.

13. The system of claim 9, wherein the host differential pilot signal and the device differential pilot signal are sine waves.

14. The system of claim 9, wherein the cable has a length equal to or greater than 50 meters.

15. A non-transitory computer-readable medium comprising instructions executable in a computer system, wherein the instructions when executed in the computer system cause the computer system to carry out a method for establishing a communications link over a cable between a host and a device, the method comprising:
- generating and sending over a first pair of conductors of the cable assembly a host differential pilot signal to the device, wherein the host differential pilot signal is AC-coupled to the first pair of conductors;
- receiving a device differential pilot signal over a second pair of conductors of the cable assembly from the device, wherein the device differential pilot signal is AC-coupled to the second pair of conductors,
- wherein in response to a host differential pilot signal being received at the device and found to be valid, the device sends the device differential pilot signal to the host and is ready to respond to a protocol initiated by the host, and
- wherein in response to the device differential pilot signal being received at the host and found to be valid, the host is ready to initiate the protocol with the device; and
- initiating the protocol over a third pair of conductors.

16. The non-transitory computer-readable medium of claim 15, wherein the third pair of conductors is any pair of conductors of the cable assembly including the first pair or the second pair.

17. The non-transitory computer-readable medium of claim 15, wherein the host differential pilot signal received at the device is found to be valid by comparing the host differential pilot signal to a differential threshold.

18. The non-transitory computer-readable medium of claim 15, wherein the device differential pilot signal received at the host is found to be valid by comparing the device differential pilot signal to a differential threshold.

19. The non-transitory computer-readable medium of claim 15, wherein the cable between the host and the device includes a power over Ethernet (POE) device, where in the power over Ethernet (POE) device is configured to provide power to the device via the cable.

20. The non-transitory computer-readable medium of claim 19,
wherein the POE device intercepts one of the pairs of conductors of the cable assembly; and
wherein the POE device maintains an AC-coupled path for the intercepted pair.

* * * * *